United States Patent [19]
Kight et al.

[11] Patent Number: 5,623,357
[45] Date of Patent: *Apr. 22, 1997

[54] METHOD AND APPARATUS FOR THE MONITORING AND DEMARCATION OF SYNCHRONOUS DIGITAL HIERARCHY NETWORKS

[75] Inventors: William D. Kight, Ellicott City; Robert E. Pfister, Mount Airy, both of Md.

[73] Assignee: GRC International, Inc., Vienna, Va.

[*] Notice: The term of this patent shall not extend beyond the expiration date of Pat. No. 5,355,238.

[21] Appl. No.: 475,529

[22] Filed: Jun. 7, 1995

Related U.S. Application Data

[63] Continuation of Ser. No. 108,338, Aug. 8, 1993, Pat. No. 5,355,238.

[51] Int. Cl.$^6$ ............................................. H04J 14/08
[52] U.S. Cl. ........................... 359/135; 370/907; 380/15
[58] Field of Search .................................. 359/135–136, 359/139, 158; 370/94.1, 94.2, 110.1; 380/2, 9, 15, 49

[56] References Cited

U.S. PATENT DOCUMENTS

| | | | |
|---|---|---|---|
| 4,319,273 | 3/1982 | Nossem | 380/15 |
| 4,449,247 | 5/1984 | Waschka, Jr. | 455/9 |
| 5,142,529 | 8/1992 | Parruck et al. | 370/84 |
| 5,150,243 | 9/1992 | Suzuki | 359/110 |
| 5,185,726 | 2/1993 | Tyrrell et al. | 370/55 |
| 5,189,410 | 2/1993 | Kosugi et al. | 340/825.14 |
| 5,247,518 | 9/1993 | Takiyasu et al. | 370/85.15 |
| 5,355,238 | 10/1994 | Kight et al. | 359/135 |
| 5,471,476 | 11/1995 | Hiramoto | 370/105.1 |

Primary Examiner—Wellington Chin
Assistant Examiner—Kinfe-Michael Negash
Attorney, Agent, or Firm—Finnegan, Henderson, Farabow, Garrett & Dunner, L.L.P.

[57] ABSTRACT

A method and apparatus for establishing an intelligent demarcation between facility and terminal segments of asynchronous optical network. Network management information contained with the overhead structure of the synchronous optical network signal is extracted and manipulated in accordance with a predetermined user specification; overhead data may be translated, terminated, or passed unaltered as required. Overhead processing towards the facility and terminal segments need not be symmetrical. Payload information is passed unaltered although future provisions for encrypting payload data exist. Full performance monitoring is supported along with a built-in-test and diagnostic capability. The device may be both locally and remotely controlled and monitored. Remote control is implemented via the overhead information contained within the synchronous optical network signal.

14 Claims, 5 Drawing Sheets

METHOD AND APPARATUS FOR THE MONITORING AND DEMARCATION OF SYNCHRONOUS DIGITAL HIERARCHY NETWORKS

RELATED APPLICATIONS

This application is a continuation-in-part of Patent Cooperation Treaty Application Ser. No. PCT/US94/06632, filed Jun. 10, 1994, which is a continuation of U.S. application Ser. No. 08/108,338, filed Aug. 8, 1993, now U.S. Pat. No. 5,355,238.

BACKGROUND OF THE INVENTION

1. Technical Field

This invention relates to communications networks, and more particularly to synchronous fiber optic telecommunication networks, specifically to the demarcation and performance monitoring of such networks at critical interfaces between public and private network entities.

2. Background Art

Fiber Optic networks have been in existence for some time now. The original fiber optic networks however typically employed proprietary asynchronous multiplexing schemes and interoperation between unrelated network elements was generally not possible. As fiber optic networks became more prevalent the need to efficiently connect fiber optic network segments directly at the optical level has become more critical.

The Synchronous Optical Network (SONET) standards were developed by the telecommunications industry to overcome the limitations of proprietary asynchronous schemes. SONET standards define an open network architecture that allows true multi-vendor interoperability. The SONET standards have subsequently been adopted by the international community and are known worldwide as the Synchronous Digital Hierarchy (SDH).

An essential element of the SONET standard signal structure is a transport overhead data structure that supports enhanced network performance monitoring and network operations. The transport overhead contains among other things: parity information, protection switching control bytes, payload pointer and control bytes, a user data channel, local and express orderwire channels, and two data communication channels.

The two data communication channels are actually independent packet data networks designed to support Network Operations and Support Systems. Network Operations and Support Systems are the management tools used by telecommunication service providers to control and monitor the various elements present on their networks. Using the CCITT Q.921 LAPD protocol, which is very similar to the ANSI X.25 protocol, it is possible for any device on the network to access and control any other device via the SONET data communication channels.

It was the intent of the SONET standards committees to develop a ubiquitous and homogenous fiber optic network whereby any element of the network could fully interoperate with any other element in the network. Manufacturers of SONET switching systems and SONET multiplexers have been staging multi-vendor demonstrations with an emphasis on interoperability at the fiber optic level.

The SONET standards however do not adequately reflect the political nature of the SONET network. Whereas SONET strives towards universal access and interoperability there are operational factors that force network operators to segment and isolate portions of the network. This situation can occur when two different service providers must interface with each other, or when a public service provider must extend service to a private customer premise.

For obvious reasons relating to network security, service providers need to restrict outside access to internal network operations. The data communications channels contained within the SONET transport overhead, designed to be open network management interfaces, represent a potential weak spot in the network security system.

Presently, SONET network segments are typically isolated at the boundaries between service providers by using back-to-back multiplexers; only the constituent channel data is passed between network segments and the SONET transport overhead functions are removed entirely. This type of interface defeats the open architecture of the network but must be maintained as a well defined demarcation point between network segments.

When extending SONET services to a private customer premise, a public service provider must rely upon the limited network security features supported by the transmission equipment on either end of the fiber optic span to protect the public network operations systems from unauthorized or unintended access. As Asynchronous Transfer Mode (ATM) terminals become more commonplace this problem will become more critical.

There exists a need for a unique device that can be used to interconnect SONET network segments directly at the SONET signal level while selectively isolating and controlling the transport overhead data passing between the segments. This invention, referred to as an Optical Service Unit (OSU), directly addresses this need by combining hardware technology from the SONET multiplexer industry with an embedded software package designed to control and monitor the SONET transport overhead.

There is very little prior art that relates to this application. Beyond the fact that SONET systems are relatively new, the lack of prior art is also related to the novel and unobvious nature of this device which runs counter to the open systems interconnection objectives of the SONET standards. The function represented by the Optical Service Unit is not defined in the SONET standards.

Previously, optical interfaces have differed from the Optical Service Unit because they all terminate proprietary networks. The Optical Service Unit however acts as an mid-span intelligent interface between two standardized networks; the Optical Service Unit passes only the payload plus selected overhead data as programmed by the user.

The Optical Service Unit includes an orderwire function similar to that described by U.S. Pat. No. 4,449,247 to Waschka, but the implementation is based upon the embedded orderwire channels in the SONET transport overhead. In contrast, Waschka use a wavelength multiplexing technique on a proprietary signal format.

Some traditional T1 and T3 electrical network interfaces contain a device referred to as a Channel Service Unit, from which the Optical Service Unit derived its name. The Channel Service Unit terminates and isolates a digital trunk interface in order to protect the public network from harm due to improper voltage levels or signaling formats that may be introduced by the customer premise equipment. Channel Service Units can also be configured to monitor network performance and support basic network testing operations.

The electrical network however was never intended to be as fully open and interoperable as is the SONET network.

Channel Service Units perform the very clear and well defined function of isolating the electrical network at its demarcation points. The Optical Service Unit will perform a similar function for the optical network however the task is far more complicated.

Unlike a Channel Service Unit, the Optical Service Unit cannot totally isolate the SONET network. If it did, the benefits of having an extended network management system via the transport overhead would be lost. The Optical Service Unit must intelligently pass the transport overhead; allowing some but not all of the overhead data to pass.

The filtering function of the Optical Service Unit is not unlike that found in Local Area Network Routers. Routers examine the data terrific on the Local Area Network and pass only that data which meets a user defined set of criteria. Routers are commonly used to segment Local Area Networks for maintenance, performance, and security reasons.

In this invention the functions of the Local Area Network Router are merged with the functions of a channel service unit; the product is then embedded in the hardware technology of a SONET Multiplexer front-end to create an Optical Service Unit. This novel combination of features has been overlooked by industry and no similar device is known to exist or has been proposed to date.

SUMMARY OF THE INVENTION

The Optical Service Unit provides a compact and cost effective means of interconnecting synchronous optical network segments while maintaining control over the network management information that passes through the interface.

The objects and advantages of the present invention are:
(a) To provide an intelligent and secure demarcation point between segments of an SDH, SONET, or other communications networks;
(b) To provide an intelligent and secure demarcation point between a network service provider and a customer premise;
(c) To continuously monitor and record network performance monitoring data to assist network service providers in identifying network faults;
(d) To provide automatic built-in-test functions and diagnostic loop-back capabilities to assist network service providers in isolating network faults;
(e) To provide local and express orderwire functions to assist field service technicians coordinating network testing with other network sites;
(f) To provide visual indications of the status of the SDH or SONET fiber optic interface;
(g) To provide a modular fiber optic connection on the terminal side (customer premise) of the device to reduce faults caused by improper connection of customer premise equipment;
(h) To eliminate the need for costly high-powered optical interfaces in customer premise equipment since the Optical Service Unit will drive the long range fiber;
(i) To require less physical space than an equivalently configured set of back-to-back multiplexers;
(j) To provide a means for translating dissimilar overhead formats such as SONET and SDH;
(k) To allow controlling and monitoring by the network service provider via the SDH or SONET embedded network management data communication channels;
(l) To allow reprogramming remotely by the network service provider via the SDH or SONET embedded network management data communication channels;
(m) To allow controlling, monitoring, and reprogramming, locally via the craft interface serial computer interface port;
(n) To allow programming by the network service provider to restrict or eliminate access to the network management data communication channels;
(o) To allow programming to translate network management information where compatibility problems between vendor equipment may exist;
(p) To allow interconnection with adjacent Optical Service Units to support centralized management of multiple units via one craft interface on one unit; and
(q) To allow interconnection with adjacent Optical Service Units to support Automatic Protection Switching.

Further objects and advantages will become apparent from the ensuing description and drawings.

To achieve these and other advantages and in accordance with the purposes of the invention, as embodied and broadly described, the invention recites a method for demarcating a network communications signal transmitted between a facility and a terminal comprising the steps of: receiving the synchronous optical network communications signal from either the facility or the terminal; identifying overhead information contained within the synchronous optical network communications signal; locating any restricted overhead information in the overhead information; limiting the synchronous optical network communications signal to exclude the restricted overhead information, if any; and passing the restricted synchronous optical network communications signal to the other of either the facility or the terminal.

In addition, the invention also recites a communications network device, comprising: means for receiving a signal; means for separating the signal into a payload component and an overhead component; means for monitoring the overhead component to identify any prohibited information in the overhead component; means for restricting the overhead component to exclude any prohibited information determined by the monitoring means; and means for transmitting a restricted signal comprising the payload component and the restricted overhead component.

The invention also recites a communications network device, comprising: a first signal interface for receiving a signal; a frame synchronizer for separating the signal into a payload component and an overhead component; a microprocessor for monitoring the overhead component to identify any prohibited information in the overhead component; an overhead processor for restricting the overhead component to exclude any prohibited information determined by the monitoring means; and a second signal interface for transmitting a restricted signal comprising the payload component and the restricted overhead component.

DESCRIPTION OF THE PREFERRED EMBODIMENT

Figure 1:
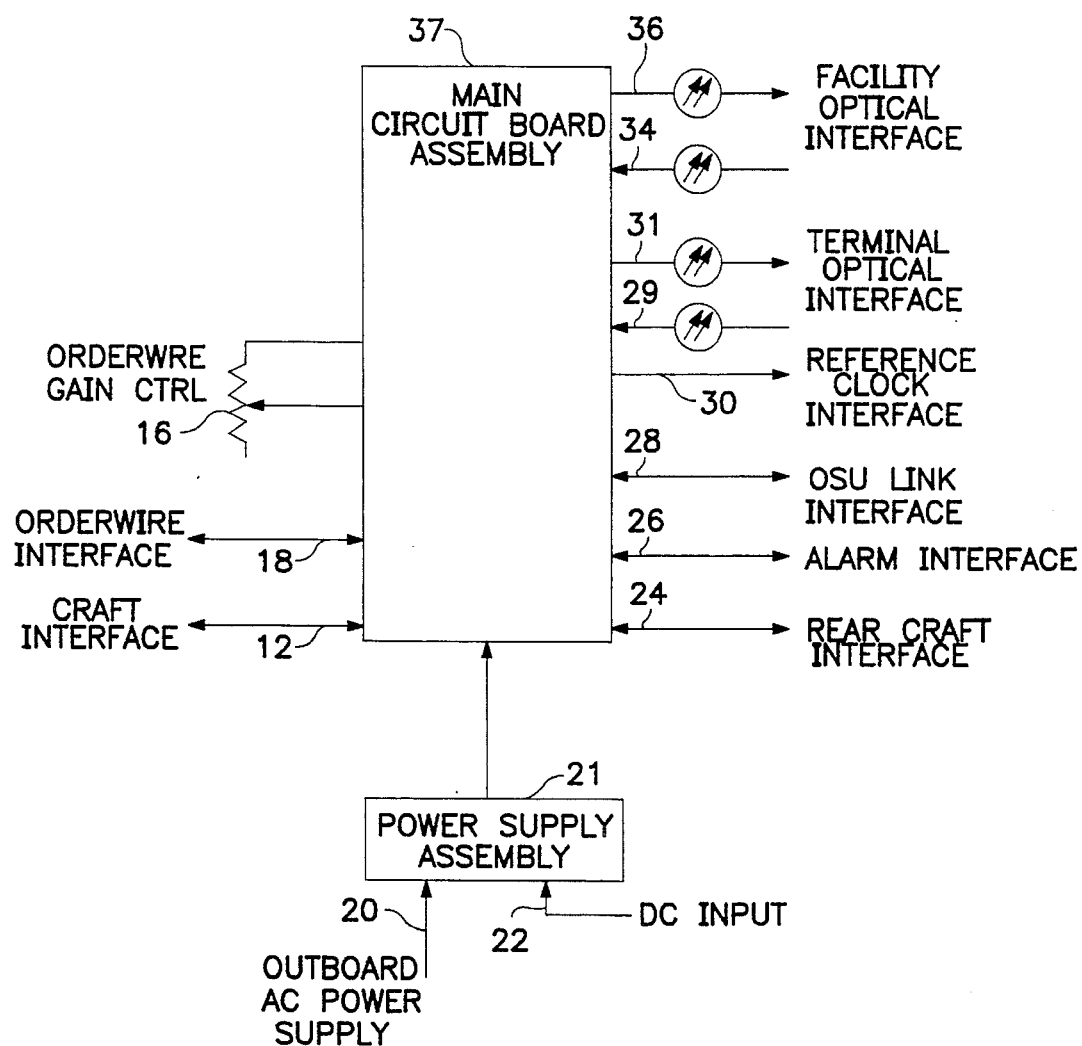
FIG. 1 is a block diagram of the Optical Service Unit according to a preferred embodiment of the present invention.

An electrical diagram of the invention, hereinafter referred to as an Optical Service Unit, is illustrated in FIG. 1. The optical service unit consists of a main circuit board assembly 37 and a power supply assembly 21. In addition, various signal and control interfaces exist as described in the following text.

A craft interface 12 is provided for local maintenance access by field service personnel. This interface may be used to control, configure, test, and monitor the Optical Service Unit using a teletype, video terminal, or personal computer serial communications program.

To assist field service personnel with on-site testing, the Optical Service Unit supports both local and express orderwire capabilities via an orderwire interface 18. The relative amplitude of the orderwire audio is adjusted using an orderwire gain control 16. The orderwire interface may be selected to operate in bridged mode or terminal mode. The orderwire interface is activated and the mode is selected via the craft interface 12.

The Optical Service Unit may be powered from conventional 110/220 Volts Alternating Current line power via an outboard AC power supply 20. The unit may also be powered from 48 Volts Direct Current battery power using a DC power input 22.

A rear craft interface 24 is wired independent of the craft interface 12 and supports X.25 and RS-232 interfaces. The rear craft interface may be used for remote control of the unit via an external communications network or dial-up modem.

An alarm interface 26 provides form-C dry contact closures corresponding to minor, major, and catastrophic failures detected within the unit. Additional device control and status leads may be supported via this interface as required.

An OSU link interface 26 supports a high-speed digital communications interface that is used to interconnect adjacent Optical Service Units and related peripheral devices. This interface will be used to support automatic protection switching when implemented. It may also be used to support a common management interface between multiple Optical Service Units. In the preferred embodiment the OSU link interface 26 is implemented as an Ethernet LAN.

Figure 2:
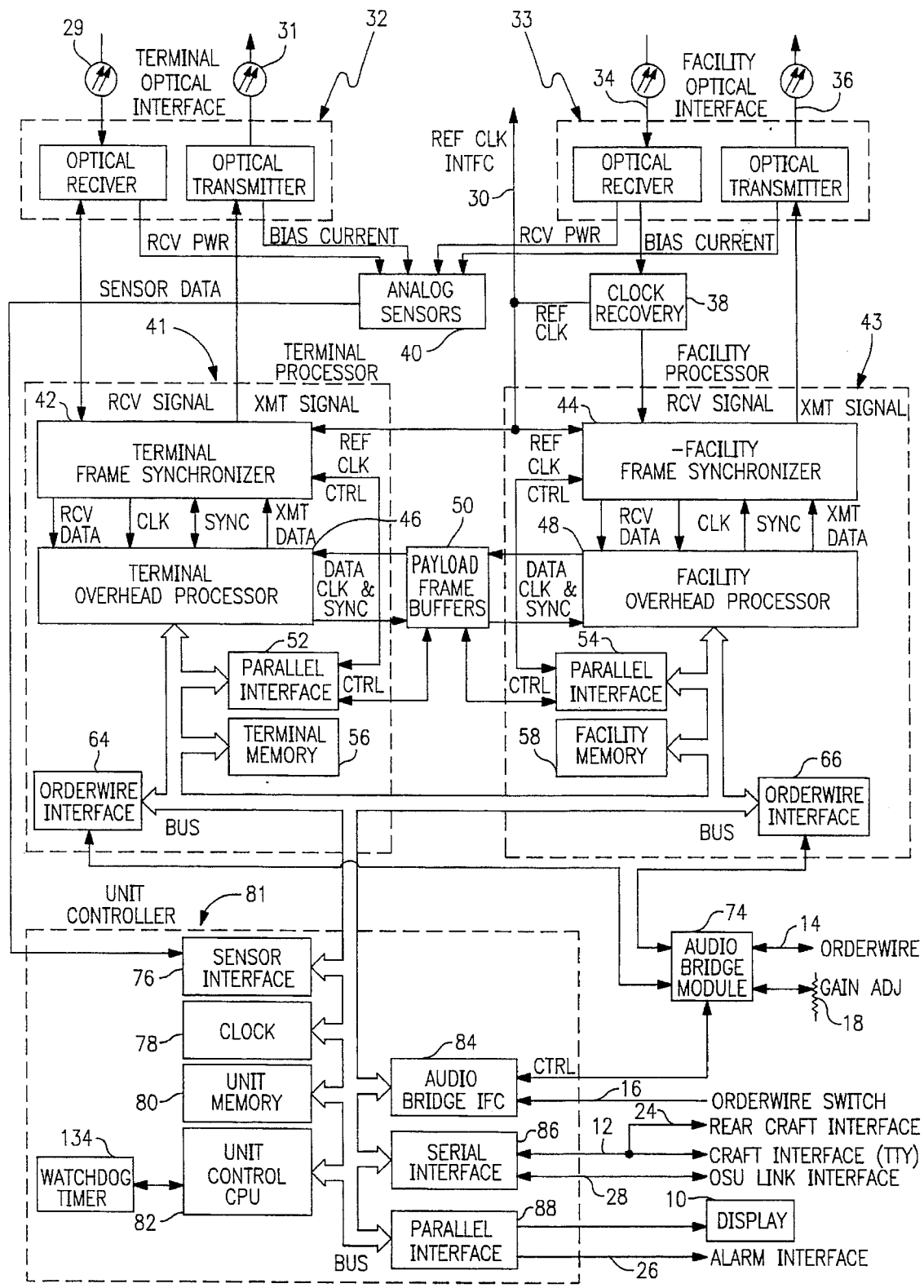
FIG. 2 is a block diagram of the main printed circuit board assembly within the Optical Service Unit of a preferred embodiment of the present invention.

A reference clock interface 30 provides a stable square-wave clock signal recovered from the facility side optical termination via a clock recovery module 38 (shown in FIG. 2). A possible variation of this unit will allow the reference clock interface 30 to be used either as an output or as an input.

Synchronous optical communications signals on the terminal side of the Optical Service Unit are connected via a terminal optical interface 32 (shown in FIG. 2) using any desired type of connector. Although the preferred embodiment uses an FC/PC connector, any other kind of connector may be used. Synchronous optical communications signals on the facility side of the Optical Service Unit are connected to a facility optical interface 33 via a facility fiber optic input 34 and a facility fiber optic output 36. The facility optical interface 33 uses conventional ST type connectors, however other standard fiber optic connector types may be directly substituted. Synchronous optical communications signals on the terminal side of the Optical Service Unit are connected to a terminal optical interface 32 via a terminal fiber optic input 29 and a terminal fiber optic output 31. The terminal optical interface 32 uses conventional ST type connectors, however other standard fiber optic connector types may be directly substituted.

Three displays of unit error states are integrated directly into the main circuit board assembly 37. These are: minor alarm state, major alarm state, and critical alarm state for both terminal and facility side optical interfaces.

The power supply assembly 21 consists of a power supply that can accept DC input voltages. In the preferred embodiment, the power supply assembly 21 accepts an input of 48 V DC.

An electrical block diagram of a preferred embodiment of the main circuit board assembly 37 is illustrated in FIG. 2.

The facility optical output 36 preferably uses a solid state Intermediate Range LASER device with integral bias and modulation control circuitry. The facility optical input 34 preferably uses a InGaAs PIN Photodiode with integral transimpedance amplifier and pseudo ECL data interface.

The received optical signal on the facility side of the unit is passed through a clock recovery module 38 prior to connection to a facility frame synchronizer 44. Framed data from the facility frame synchronizer 44 is then passed to a facility overhead processor 48.

The synchronous optical communications signal contains an overhead component and a payload component. The overhead component carries framing information, performance monitoring data, network management data, user control data, and the local and express orderwire channels. The payload component carries the actual traffic bearing content of the signal.

The facility overhead processor 48 extracts the overhead information from the received signal and places it in a memory mapped region of the unit control central processing unit 82 address space whereby operations such as translation can be provided.

Figure 3:
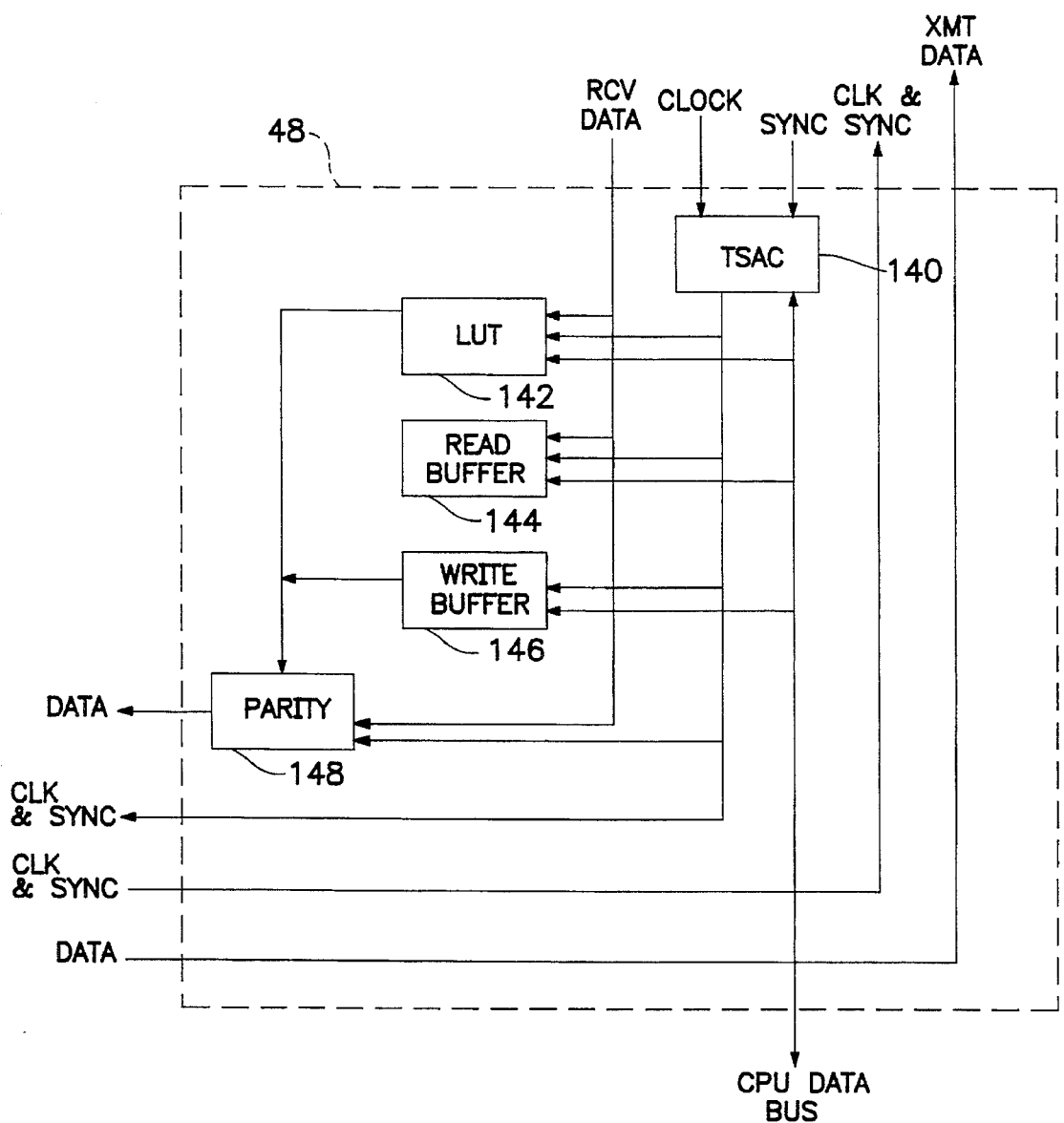
FIG. 3 is a block diagram of the facility overhead processor of a preferred embodiment of the present invention.

As shown in FIG. 3, the facility overhead processor includes a Time Slot Assigner Circuit (TSAC) 140, a Look-Up Table (LUT) 142, a read buffer 144, a write buffer 146, and a parity processor 148. The TSAC 140 uses the clock and sync inputs from the facility frame synchronizer 44 to control the flow of data through the facility overhead processor 48. Each byte in the frame structure may be passed straight through the parity processor 148 or routed through the either the LUT 142 or the read buffer 144 according to user-programmed tables. The TSAC 140 also controls the write buffer for inserting data into the frame structure. The TSAC 140 is controlled by the unit control central processing unit 82 via the data bus.

The LUT 142 is used to translate received bytes into new output bytes based on a simple look-up table algorithm. The LUT 142 is controlled by the unit control central processing unit 82 via the data bus.

The read buffer 144 is used to monitor specific byte locations. The read buffer 144 may be accessed by the unit control central processing unit 82 via the data bus.

The write buffer 146 is used to insert user-programmed data into specific byte locations in the overhead data. The write buffer 146 may be accessed by the unit control central processing unit 82 via the data bus.

The parity processor 148 checks the parity of the received signal and adjusts the parity of the transmitted signal to compensate for any changes made to the data.

Returning to FIG. 2, the payload content of the received signal is passed directly by facility overhead processor 48 to a payload frame buffer 50. Frame buffer 50 is a First-In-First-Out (FIFO) buffer that compensates for variations in payload frame alignment between the facility and terminal sides of the device. The payload frame buffer 50 can be modified to perform payload-only processing such as encryption. The overhead data can be manipulated by the facility overhead processor 48 to implement operations such as translation.

The received facility payload is then passed from the payload frame buffer 50 to a terminal overhead processor 46. Overhead data supplied by unit control central processing unit 82 is appended to the payload and then forwarded to a terminal frame synchronizer 42. Frame synchronizer 42 randomizes and frames the data prior to transmission to the terminal optical interface 32. The terminal overhead processor 46 can also perform the operations on the overhead data described above with respect to the facility overhead processor 48, and is similar in construction to the facility overhead processor 48 shown in FIG. 3.

The terminal optical output 31 preferably uses a solid state Intermediate Range LASER device with integral bias and modulation control circuitry. The terminal optical input 29 preferably uses a InGaAs PIN Photodiode with integral transimpedance amplifier and pseudo ECL data interface. However, any similarly suitable means for receiving optical inputs and producing optical outputs may be used.

For optical signals received on the terminal side of the Optical Service Unit, the data path is the reverse of that described for optical signals received on the facility side of the device.

The terminal frame synchronizer 42 and the terminal overhead processor 48, together with the various peripheral devices comprise a terminal processor 41, as illustrated in FIG. 2. In similar fashion, the facility frame synchronizer 44 and the facility overhead processor 48, together with the various peripheral devices comprise a facility processor 43, as illustrated in FIG. 2.

The terminal processor 41 and the facility processor 43 communicate with each other and a unit controller 81 via inter processor data links. The inter processor data links are memory mapped within the address space of the unit controller central processing unit 82.

The unit control central processing unit 82 passes the orderwire data taken from the terminal overhead processor 46 to a terminal orderwire channel interface 64 and passes the orderwire data taken from the facility overhead processor 48 to a facility orderwire channel interface 66. The two orderwire channel interfaces buffer and clock the encoded orderwire data to and from an audio bridge module 74 at 64 kbps.

Figure 4:
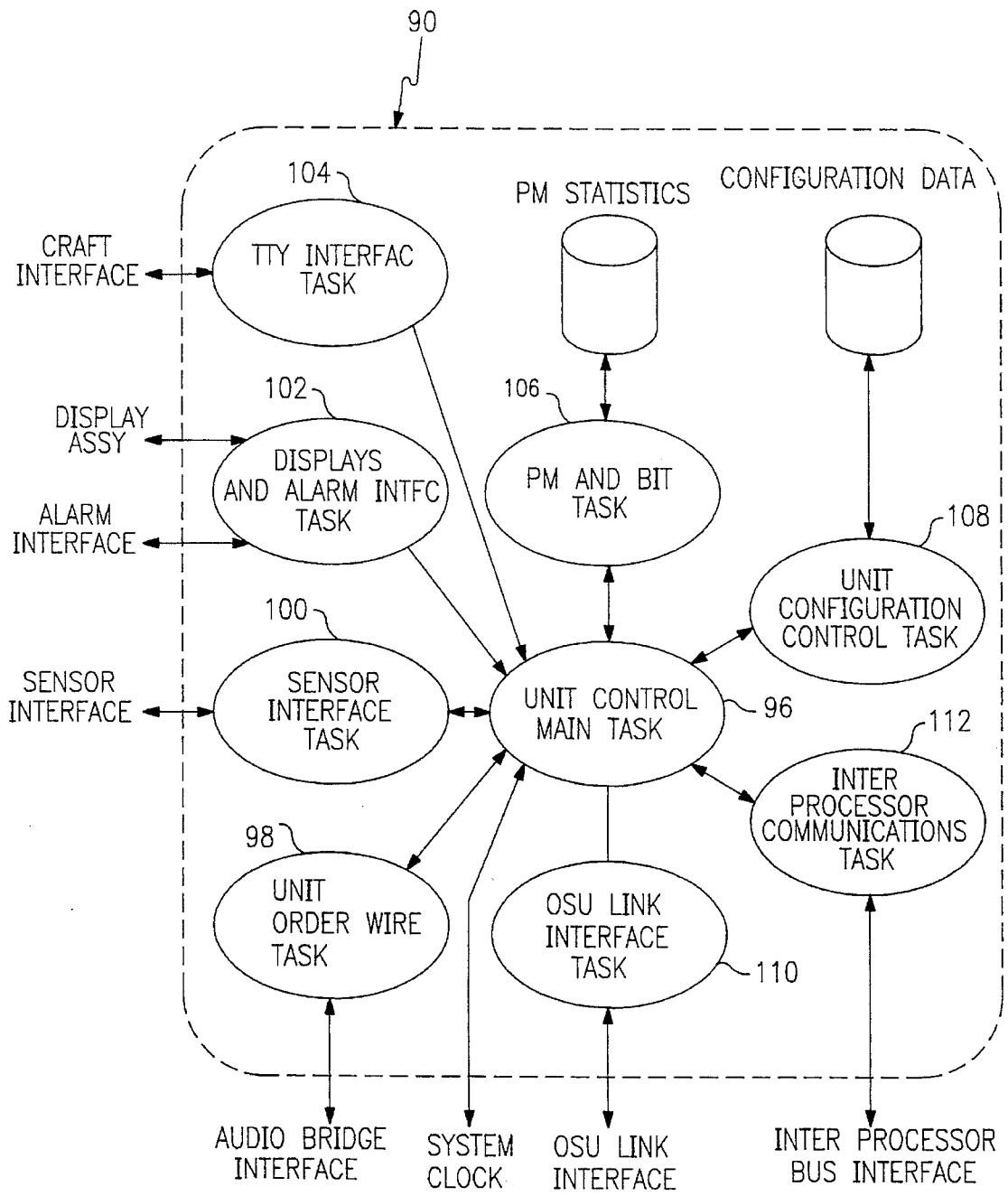
FIG. 4 shows the inter-relationships of the firmware tasks that execute the unit control functions of a preferred embodiment of the present invention.

The audio bridge module 74 contains two PCM coders that perform the digital to analog conversion. The module also bridges the orderwire audio with the local orderwire interface 18 and provides a gain stage to deliver sufficient output to drive a standard lineman's handset. The gain of the module is adjusted The audio bridge module 74 is controlled and monitored by the unit control central processor unit 82 via an audio bridge interface 84. Bridge interface 84 is a parallel interface that is memory mapped within the address space of the unit control central processor unit 82. The state of the orderwire select is determined by the unit order wire task 98, seen in FIG. 4.

The unit control central processing unit 82 is responsible for monitoring various component performance indicators within the Optical Service Unit. It does this via a sensor interface 76 connected to an analog sensor module 40 (FIG. 2). The analog sensor module 40 is an assembly of analog to digital converters which may be calibrated to measure such things as optical receive power, LASER bias current, and case temperature of the facility and terminal side optical interface components. The sensor interface 76 is a parallel interface that is memory mapped within the address space of the unit control central processor unit 82.

The unit control central processor unit 82 also interfaces with a system clock 78, a unit serial interface 86, and a unit parallel interface 88. The system clock 79 is a battery backed date and time device that returns the current calendar date and time of day.

The unit serial interface 86 is a dual port universal synchronous/asynchronous receiver transmitter (USART) device that supports most common serial interface protocols. One port of unit serial interface 86 is used for the craft interface 12 and rear craft interface 24, which are wired independently. The second port of unit serial interface 86 is used by the OSU link interface 28.

The unit parallel interface 88 drives form-C contact closure relays for the alarm interface 26 and lamp drivers for the display assembly 10. Control lines (not shown in FIG. 2) from the interface are also used to reset the unit control central processor unit 82.

A watchdog timer assembly 134 protects the unit control central processor unit 82 from becoming locked-up or halted in an illegal state. Timer 134 must be periodically set by the CPU 82 or it will force a hardware reset of the unit upon expiration. Timer 134 also controls power-up sequencing and issues a hardware reset to the CPU 82 after power supply voltages have stabilized and the unit is ready to boot.

The unit control central processor unit 82 has an independent memory area consisting of both Random Access Memory (RAM) and Electronically Erasable Programmable Read Only Memory (EEPROM). This is represented by the terminal memory 56, facility memory 58, and unit memory 80, respectively. EEPROM is used to store the executable program firmware, to maintain the most recent performance monitoring data, and to maintain the most recent unit configuration. RAM is used for real-time manipulation of data and storage of variable and temporary data. The executable firmware is copied from the EEPROM to RAM to improve program performance.

Figure 5:
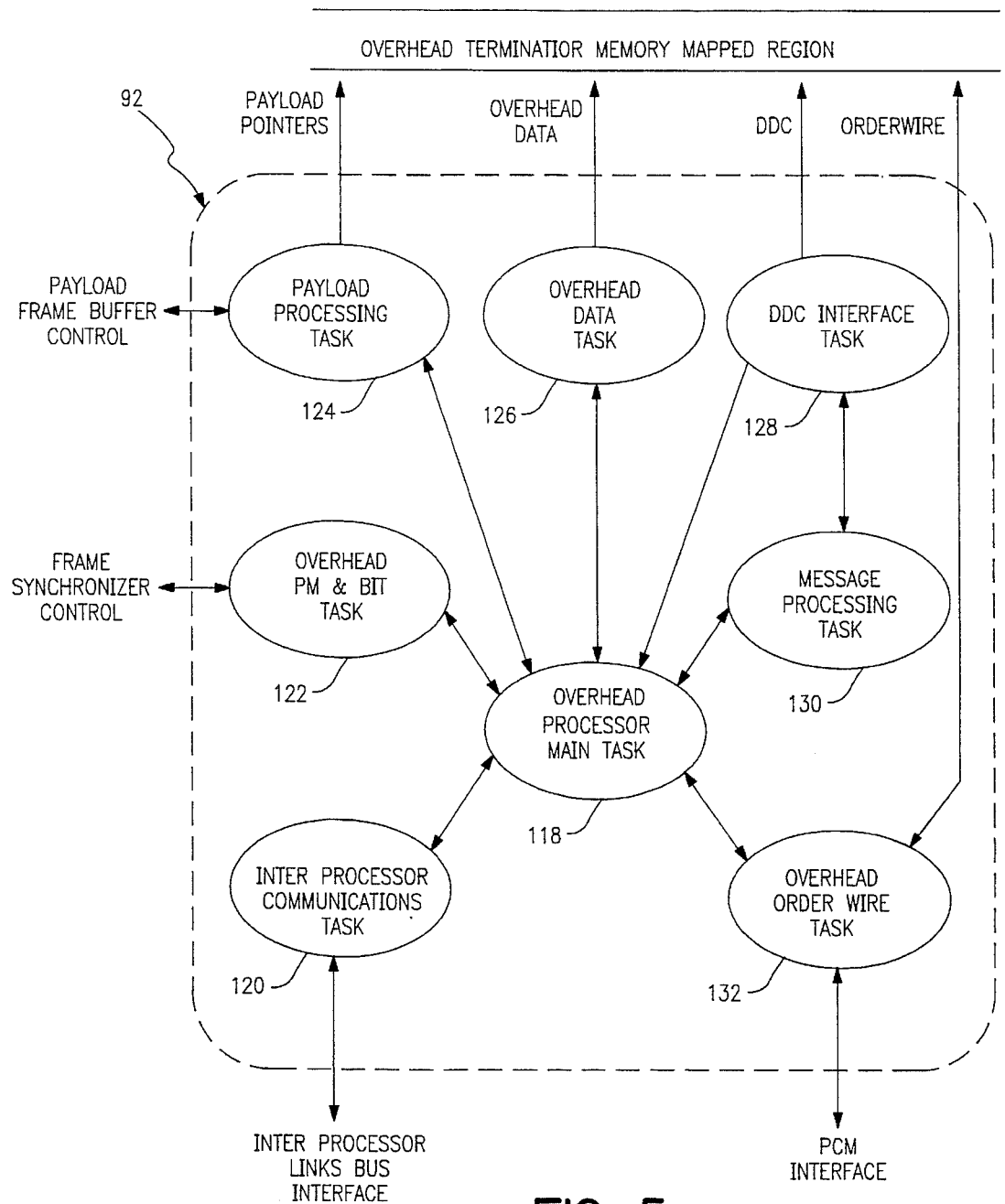
FIG. 5 shows the inter-relationships of the firmware tasks that execute the overhead processing functions of a preferred embodiment of the present invention.

The Optical Service Unit firmware which largely determines the operational characteristics of the unit is preferably divided into two major programs; a unit control program 90 (FIG. 4) and an overhead processor program 92 (FIG. 5).

The unit control program 90 (FIG. 4) is built upon a real-time multi-tasking embedded operating system. In the preferred embodiment, a unit control main task 96 is the primary executable task that boot-straps the firmware, initializes the operating system, and spawns an orderwire task 98, sensor interface task 100, display and alarm task 102, TTY interface task 104, PM and BIT task 106, unit configuration control task 108, OSU link interface task 110, and unit inter processor communications task 112. The unit control program 90 is stored in unit memory 80 and executes on the unit controller central processor unit 82.

The overhead processor program 92 (FIG. 5) is preferably built upon the same real-time multi-tasking embedded operating system used in the unit control program 90. In the preferred embodiment, an overhead processor main task 118 is the primary executable task that boot-straps the firmware, initializes the operating system, and spawns an overhead inter processor communications task 120, PM and BIT task 122, payload processing task 124, overhead data task 126, DDC interface task 129, message processing task 130, and overhead orderwire task 132. The overhead processor program 92 is preferably stored in the memory module 56 and executed on the unit control central processor unit 82. The overhead process program may be executed by either the terminal processor 41 or the facility processor 43 of FIG. 2. Although in the preferred embodiment the overhead processor program 92 is stored in a single memory module 56 and executed by a single overhead central processing unit 82, alternate embodiments may employ separate central processing units and memory modules for the terminal processor 41 and the facility processor 43.

The unit control program 90 and the overhead processor program 92 are built upon object oriented software design techniques. Each task within a program performs a specific function and communicates with other tasks via standardized message queues supported by the embedded operating system. The same standardized message format is extended to inter-processor communications between the unit controller 81, the facility processor 43, and the terminal processor 41.

The unit commences operation upon application of primary power to the main circuit board assembly 37. The watchdog timer 134 issues a reset command to the unit control central processor unit 82 forcing a boot-strap operation to begin. The Unit Control Program 90 (FIG. 4) is loaded and the unit control main task 96 begins The unit control main task 96 loads and activates the remaining tasks in the unit control program 90 then performs a built-in-self- test to validate the processor's operational integrity. The unit controller 81 then resets the unit control central processor unit 82 to force a boot-strap load of their respective copies of the overhead processing program 92 (FIG. 5).

The overhead processor main task 118 begins execution in each of the overhead processors and loads the remaining tasks in the overhead processing program 92. A built-in-self-test is performed to validate the operational integrity of the processor and a successful start-up message is sent from the overhead processor to the unit controller 81. If unit controller 81 does not receive a valid start-up message from the facility processor 43 and the terminal processor 41 within a predetermined amount of time, an error condition is declared and the Optical Service Unit will shut down.

If the overhead processors load successfully they immediately begin processing the synchronous optical communications signal overhead information. The DDC interface task 128 begins receiving the network operations message traffic contained in the DDC channels located within the overhead and forwards all received messages to the message processing task 130.

The message processing task 130 examines the received messages to determine the proper handling required. Based upon user definable criteria the message may be forwarded via the overhead inter processor communications task 120 to the opposing overhead processor, or it may be terminated locally, or it may be returned to sender, or it may be modified and forwarded. If the message is a control message directed to the Optical Service Unit itself, the message is forwarded to the unit controller 81.

The facility and terminal versions of the overhead processor program 92 need not have identical message handling criteria. For example, the message processing task 92 on the terminal processor 41 may be programmed to terminate any control messages received and forward an alarm indication. Control messages however that are received on the facility processor 43 would be accepted and forwarded to the unit controller 81.

The overhead PM and BIT task 122 in the overhead processor program 92 accumulates performance monitoring data contained within the synchronous optical communications signal overhead. Statistics are periodically sent to the unit controller 81 where they are maintained in unit memory 80 for later retrieval. The overhead PM and BIT task 122 also controls the diagnostic loopback capabilities of the frame synchronizers (42 & 44).

The payload processing task 124 manages the serial payload interface between the payload frame buffer 50 and the respective processor's overhead processors (46 & 48).

The overhead data task 126 manages the non-message based overhead data bytes. Where appropriate, the non-message based overhead data is forwarded to the opposing overhead processor via the overhead inter processor communications task 120.

The overhead orderwire task 132 manages the serial interface between the orderwire channels in the optical signal overhead and the orderwire channel interfaces (66 & 64). Command messages received from the unit controller 81 via the inter processor communications task 120 determine whether the orderwire is operating in local or express mode.

The unit control program 90 (FIG. 4) monitors and controls the overall activity of the Optical Service Unit. Upon successful loading and activation of the terminal and facility processors, 41 and 43 respectively, the unit control main task 96 enters an idle do-forever state waiting for command, status, or error messages to arrive.

Command and control messages may be received locally via the TTY Interface task 104 or via the unit inter processor communications task 112 having been received by either the terminal processor 41 or the facility processor 43. Status messages are generated periodically by the overhead processors to report performance monitoring conditions to the unit PM and BIT task 106. Error messages may be generated autonomously by any task detecting an error condition.

The TTY interface task 104 provides a command line interpreter and display interface designed for operation with teletypes, video terminals, or personal computer terminal emulator programs. In alternate embodiments a menu mode may be included as an on-line help facility to assist field service personnel with operation of the unit. The TTY Interface task 104 is password protected and reports all local access to the unit via the facility DDC interface.

The unit configuration control task 108 maintains the current hardware and software configuration of the unit, including all message processing algorithms and rules. It is possible to reprogram parts or all of the Optical Service Unit via download commands. Task 108 supervises the software load, programs the EEPROM contained with the unit memory 80 and validates the integrity of the data. Using the unit inter processor communications task 112 the terminal and facility memories, 56 and 58, may be reprogrammed as well.

The OSU link interface task 110 supports a high-speed digital interface for use in communicating between multiple Optical Service Units. Task 110 will also support a protection switching peripheral when implemented. Although in the preferred embodiment this digital interface is an Ethernet interface supporting TCP/IP access to the Optical Service Unit, any high-speed digital interface may be used that allows for adequate communication between multiple Optical Service Units.

The unit orderwire task 98 manages the orderwire interface 18. It is responsible for controlling the operation of audio bridge module 74 (FIG. 2) and for controlling the operation of the overhead orderwire task 132 (FIG. 5) operating in both the terminal and facility processors 41 and 43 respectively. The orderwire may operate in either an additive party-line mode or in terminating drop-line mode.

The PM and BIT task 106 accumulates performance monitoring statistics from the facility and terminal Processors, 41 and 43, and generates reports upon request. Reports may be requested from the local craft interface or remotely via the DCC channels contained within the synchronous optical communications signal overhead. All status and error messages are date and time stamped based upon the battery backed-up clock 78.

The sensor interface task 100 monitors the analog sensors 40 which measure such things as the transmitted output power, the received power and LASER bias currents of the terminal and facility optical interfaces, 32 and 33 respectively. If user programmed thresholds are violated, then the task broadcasts an alarm message.

During normal operation, the Optical Service Unit requires no local support and minimal remote support; it may be managed entirely via the facility optical signal overhead. Typically, the unit is programmed to pass only a certain class of messages and terminate all others; the unit automatically begins message processing whenever power is applied.

Any detected error conditions are reported via the facility optical interface and local alarm contact closures. If a local terminal is connected to the craft interface 12 an alarm message will be displayed. An external modem connection may be used by the service provider as an additional redundant means to access the unit in the event of a fiber failure. In addition to the craft interface 12, the rear craft interface 24 and the OSU link interface 28 may also be used for such error handling communications.

During maintenance operations, the Optical Service Unit may be controlled both locally via the craft interface 12 or remotely via the facility optical signal overhead. Performance monitoring information may be retrieved for each 15 minute interval of the prior 24 hours with daily summaries maintained for seven days. Various test and diagnostic functions may also be implemented to support field test operations. In addition to the craft interface 12, the rear craft interface 24 and the OSU link interface 28 may also be used for local control.

Service providers may use the Optical Service Unit to determine if the optical span is functioning properly up to the demarcation point. A principal feature of the unit is the modular fiber optic connector used on the terminal optical interface that allows a field service technician to rapidly disconnect the customer premise equipment and install a test terminal to validate the proper operation of the line. The customer premise equipment may then be easily reconnected at the end of the test.

Custom overhead and message processing programs can be installed by the service provider to solve translation problems between incompatible network elements. Using the Optical Service Unit, a service provider can operate the network with a common Network Management System while accommodating the subtle dissimilarities likely to be found between vendor's equipment.

The Optical Service Unit provides the service provider with a standardized intelligent modular demarcation point. A typical embodiment of the device will be suitable for rack mounting in an EIA standard equipment rack occupying only 1.75 inches of vertical rack space. Other variations of the unit include but are not limited to: shelf mount configurations, wall mount configurations, and sealed enclosures for outdoor or industrial use.

Accordingly, the reader will see that the Optical Service Unit improves upon any method or device currently in use today for joining independent SONET network segments together or for extending a SONET network to a customer premise. The Optical Service Unit permits service providers to:

Extend network services at SONET optical rates without jeopardizing network management security;

Manage customer premise demarcation points effectively with automatic performance monitoring and diagnostic capabilities;

Solve interface compatibility problems via the overhead translation features of the unit;

Provide a standardized network interface to the customer premise using modular fiber optic connectors thus reducing problems associated with incorrect connection and simplifying testing by field service technicians.

Although the description above contains many specificities, these should not be construed as limiting the scope of the invention but as merely providing illustrations of some of the preferred embodiments of the invention. For example, the Optical Service Unit can be repackaged for operation in a multiunit shelf mount configuration or an outdoor environmentally rigidized configuration; the optical interfaces on either terminal or facility sides of the device may be replaced with optical or electrical interfaces varying in power, wavelength, or physical termination, etc.; the SONET OC-3 rate of the optical signal may be varied to any standard SONET OC-N rate, where N is an integer from 1 to 96; the overhead processors may be programmed to perform payload processing or path overhead processing; a payload encryption capability can be added at the central stage of the device; the SONET overhead format may be replaced with an SDH format or any other overhead format; or the method of operating the Optical Service Unit system may be applied to another communications network, such as an electrical network.

Thus the scope of the invention should be determined by the appended claims and their legal equivalents, rather than by the examples given.

We claim:

1. A method for demarcating network communications signals transmitted between a facility and a terminal comprising the steps of:

receiving a network communications signal from either the facility or the terminal, wherein the network communications signal is formatted according to a SONET format or a SDH format;

identifying overhead information contained within the network communications signal;

locating any restricted overhead information in the identified overhead information;

limiting the network communications signal to exclude the restricted overhead information, if any; and passing the limited network communications signal to the other of either the facility or the terminal.

2. The method of claim 1, wherein the network communications signal is a synchronous optical communications signal.

3. The method of claim 1, further including the steps of:

reporting to either the facility or the terminal that the limiting step has been performed; and indicating the presence of restricted overhead information.

4. The method of claim 1, further including the step of monitoring the quality of the received synchronous optical network communications signal.

5. The method of claim 1, further including the step of translating the received synchronous optical network communications signal from a first format to a second format.

6. The method of claim 5, wherein the first format is the SONET format and the second format is the SDH format.

7. The method of claim 5, wherein the first format is the SDH format and the second format is the SONET format.

8. A communications network device, comprising: p1 means for receiving a signal;

means for separating the signal into a payload component and an overhead component;

means for monitoring the overhead component to identify any prohibited information in the overhead component;

means for restricting the overhead component to exclude any identified prohibited information;

first signal transmitting means for transmitting a restricted signal comprising the payload component and the restricted overhead component; and second signal transmitting means for transmitting an acknowledge signal indicating that the monitoring means has identified prohibited information in the overhead component.

9. The communications network device of claim 8, wherein the received signal and the transmitted restricted signal are optical signals.

10. A communications network device, comprising:

a first signal interface for receiving a signal, wherein the signal is formatted according to a SONET format or a SDH format or a synchronous optical network communications format;

a frame synchronizer for separating the signal into a payload and an overhead component;

a microprocessor for monitoring the overhead component to identify any prohibited information in the overhead component;

an overhead processor for restricting the overhead component to exclude any prohibited information determined by the monitoring means; and a second signal interface for transmitting a restricted signal comprising the payload component and the restricted overhead component.

11. The communications network device of claim 10, further comprising a memos for transmitting an acknowledge signal indicating that the microprocessor has identified any prohibited information in the overhead component.

12. The communications network device of claim 11, wherein when the microprocessor identifies prohibited information in the overhead component, the transmitting means transmits the prohibited information with the acknowledge signal.

13. The communications network device of claim 10, wherein the received signal and the transmitted restricted signal are optical signals.

14. A communications network device, comprising:

means for receiving a signal;

means for separating the signal into a payload component and an overhead component;

means for monitoring the overhead component to identify any prohibited information in the overhead component;

means for restricting the overhead component to exclude any identified prohibited information;

means for transmitting a restricted signal comprising the payload component and the restricted overhead component, wherein, when the monitoring means identifies prohibited information in the overhead component, the transmitting means transmits the prohibited information with an acknowledge signal.

* * * * *

UNITED STATES PATENT AND TRADEMARK OFFICE
CERTIFICATE OF CORRECTION

PATENT NO. : 5,623,357
DATED : April 22, 1997
INVENTOR(S) : Kight et al.

It is certified that error appears in the above-indentified patent and that said Letters Patent is hereby corrected as shown below:

Claim 8, col. 13, line 16, delete "p1".

Claim 11, col. 14, line 13, "memos" should read --means--.

Signed and Sealed this

Tenth Day of June, 1997

Attest:

BRUCE LEHMAN

Attesting Officer    Commissioner of Patents and Trademarks